(12) United States Patent
Yiu et al.

(10) Patent No.: US 11,831,494 B2
(45) Date of Patent: Nov. 28, 2023

(54) UE (USER EQUIPMENT) ASSISTED MEASUREMENT GAP IN NR (NEW RADIO)

(71) Applicant: Apple Inc., Cupertino, CA (US)

(72) Inventors: Candy Yiu, Portland, OR (US); Yang Tang, San Jose, CA (US); Jie Cui, Santa Clara, CA (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 872 days.

(21) Appl. No.: 16/136,813

(22) Filed: Sep. 20, 2018

(65) Prior Publication Data

US 2019/0097877 A1 Mar. 28, 2019

Related U.S. Application Data

(60) Provisional application No. 62/561,424, filed on Sep. 21, 2017.

(51) Int. Cl.
| | |
|---|---|
| *H04W 72/0453* | (2023.01) |
| *H04L 41/0803* | (2022.01) |
| *H04L 41/08* | (2022.01) |
| *H04W 24/10* | (2009.01) |
| *H04W 88/02* | (2009.01) |
| *H04L 41/0853* | (2022.01) |

(52) U.S. Cl.
CPC .......... *H04L 41/08* (2013.01); *H04L 41/0803* (2013.01); *H04W 24/10* (2013.01); *H04W 72/0453* (2013.01); *H04L 41/0853* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2014/0146732 A1* | 5/2014 | Olufunmilola | ....... | H04L 5/0073 370/311 |
| 2017/0006510 A1* | 1/2017 | Kaikkonen | ....... | H04W 36/0094 |
| 2018/0054800 A1* | 2/2018 | Yeo | ........................ | H04W 72/08 |

\* cited by examiner

*Primary Examiner* — Edan Orgad
*Assistant Examiner* — Emmanuel K Maglo
(74) *Attorney, Agent, or Firm* — Eschweiler & Potashnik, LLC

(57) ABSTRACT

Techniques discussed herein can facilitate configuration by a network of one or more measurement gaps based at least in part on UE (User Equipment) assistance. One example embodiment employable by a UE (User Equipment) comprises a memory interface; and processing circuitry configured to: generate UE capability information that comprises, for each measurement scenario of one or more measurement scenarios, an indication of whether the UE is capable of non-gap measurement in connection with that measurement scenario, wherein each measurement scenario applies to one or more associated serving frequencies and one or more associated measurement objects; and process configuration signaling that comprises, for each measurement scenario of the one or more measurement scenarios, an associated indication of whether an associated measurement gap is configured for that measurement scenario.

16 Claims, 9 Drawing Sheets

UE (USER EQUIPMENT) ASSISTED MEASUREMENT GAP IN NR (NEW RADIO)

REFERENCE TO RELATED APPLICATIONS

This application claims the benefit of U.S. Provisional Patent Application No. 62/561,424 filed Sep. 21, 2017, entitled "USER EQUIPMENT-ASSISTED MEASUREMENT GAP CONFIGURATION IN NEW RADIO", the contents of which are herein incorporated by reference in their entirety.

FIELD

The present disclosure relates to wireless technology, and more specifically to techniques for UE (User Equipment)-assisted assignment of measurement gap(s).

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Figure 1:
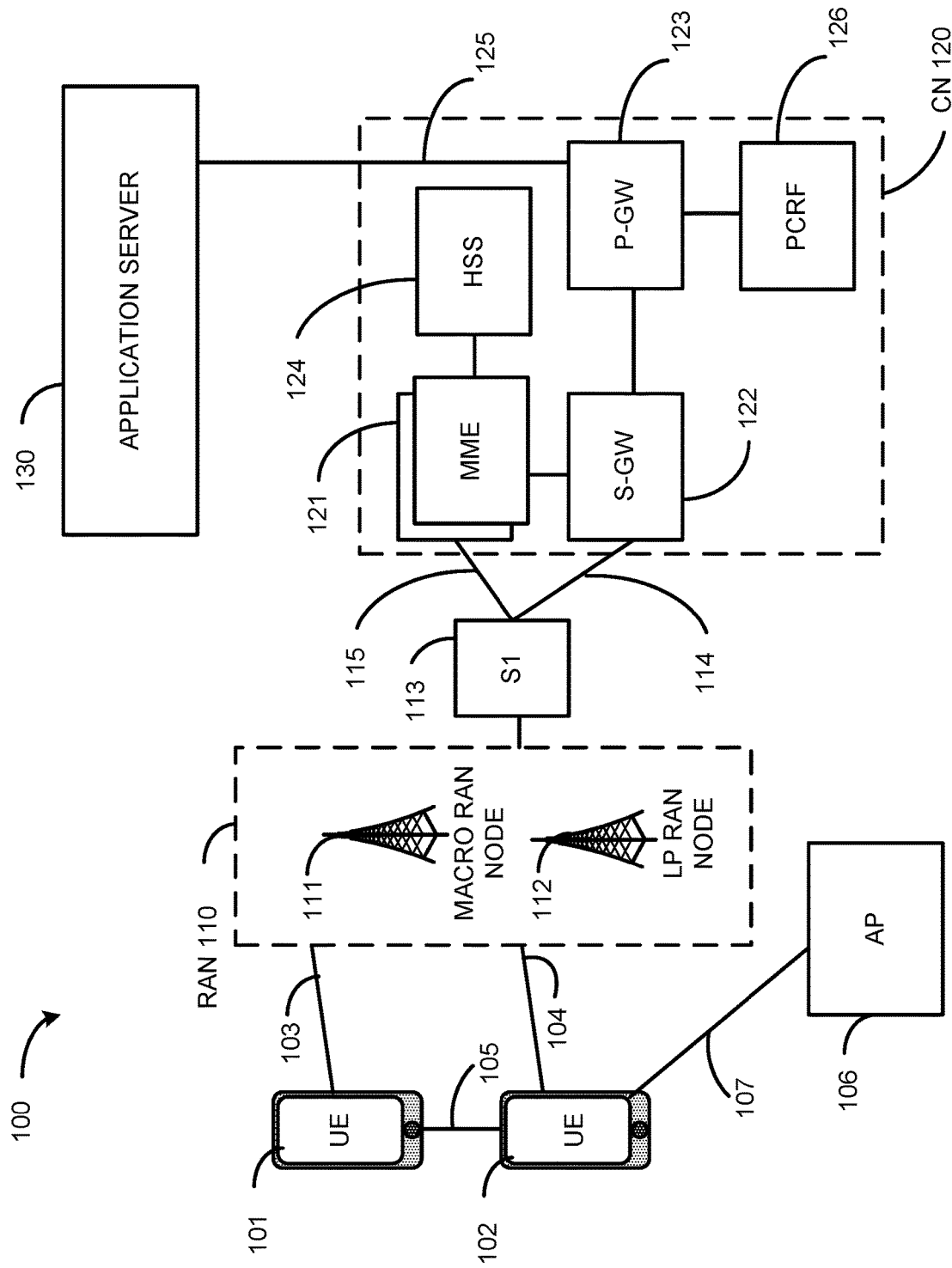
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124.

The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
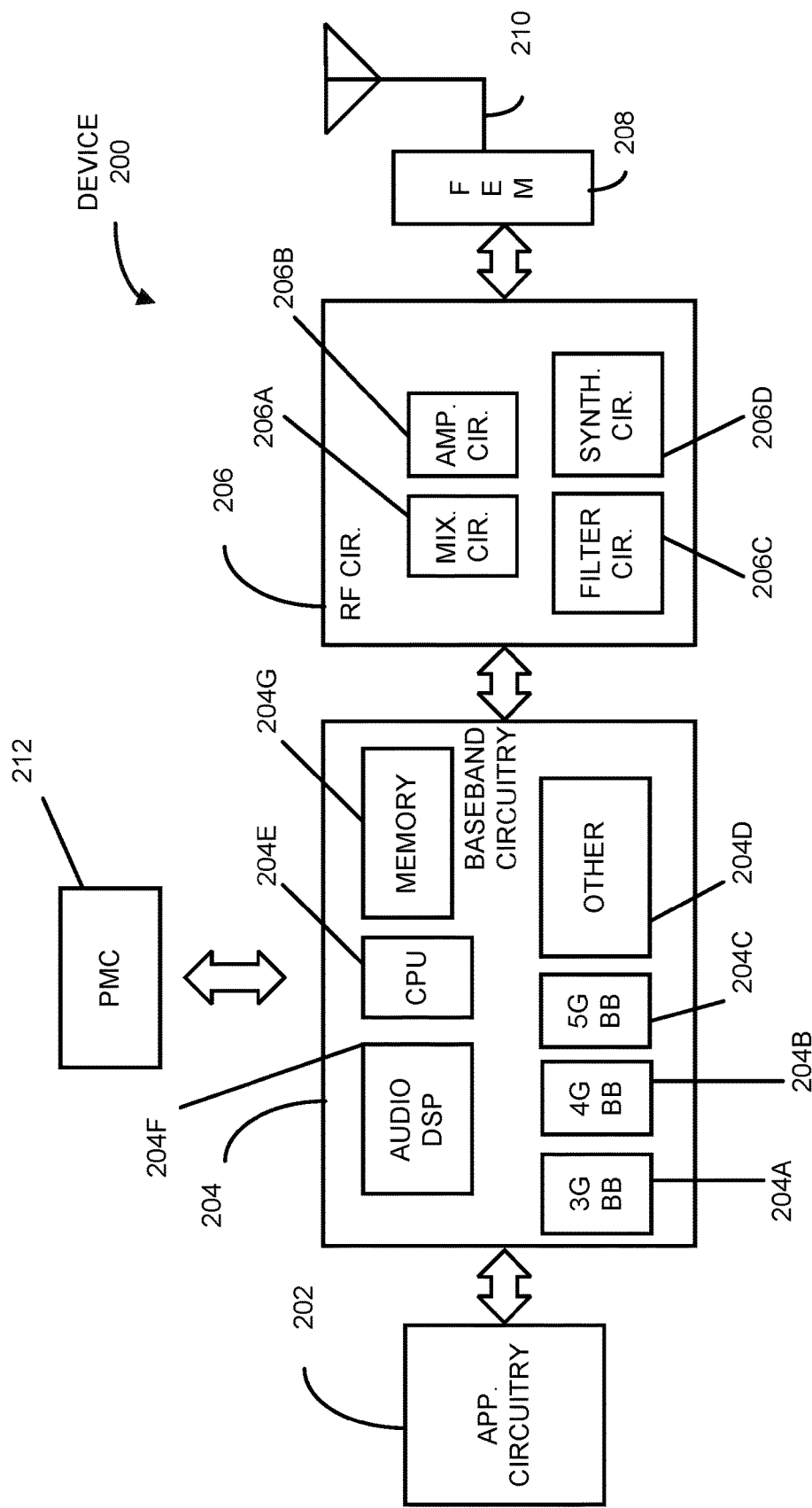
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 2 12 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
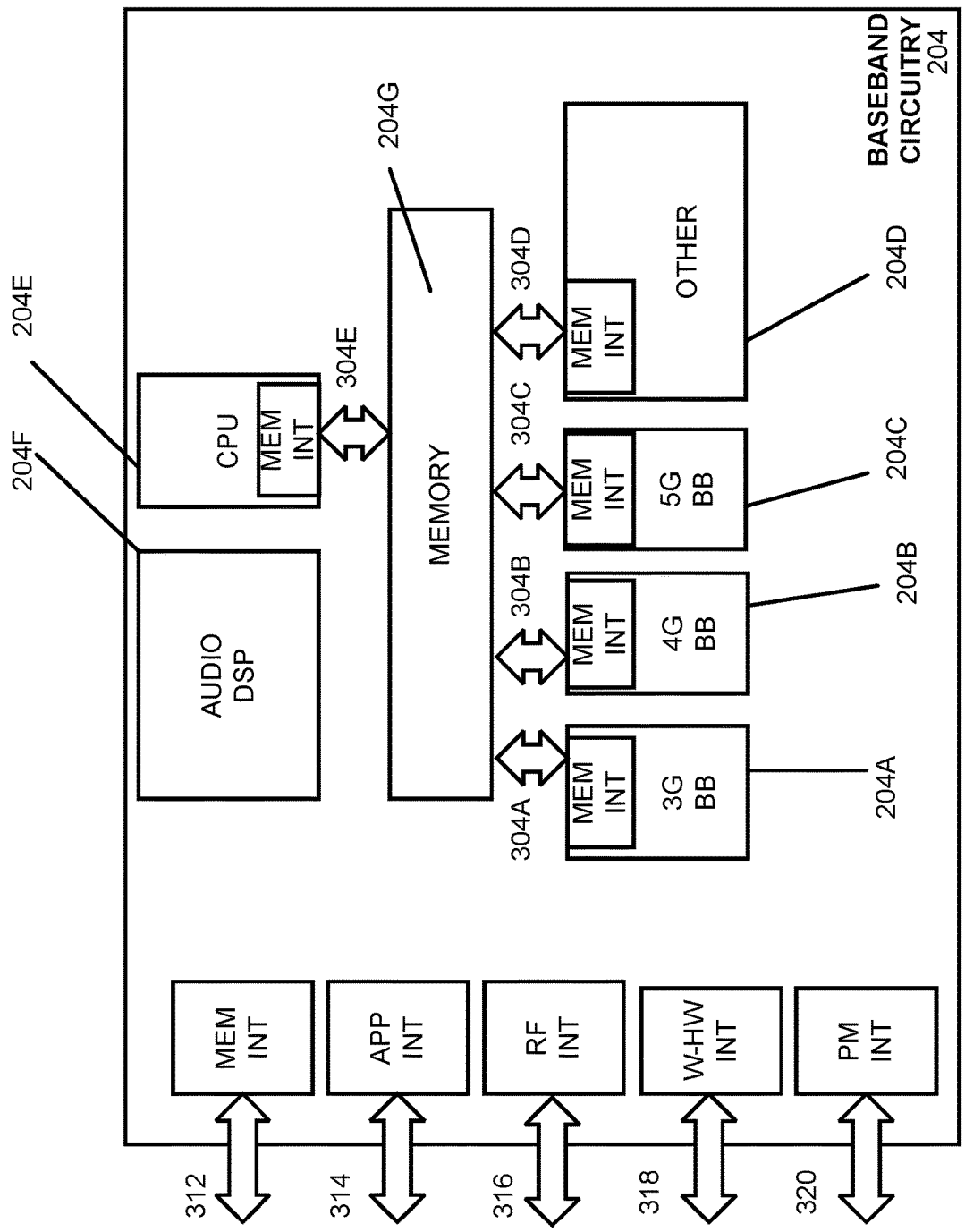
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Various embodiments discussed herein can facilitate intra-frequency, inter-frequency, and/or inter-RAT measurement at a NR (New Radio) UE (User Equipment), along with configuration of any associated measurement gap(s).

Figure 4:
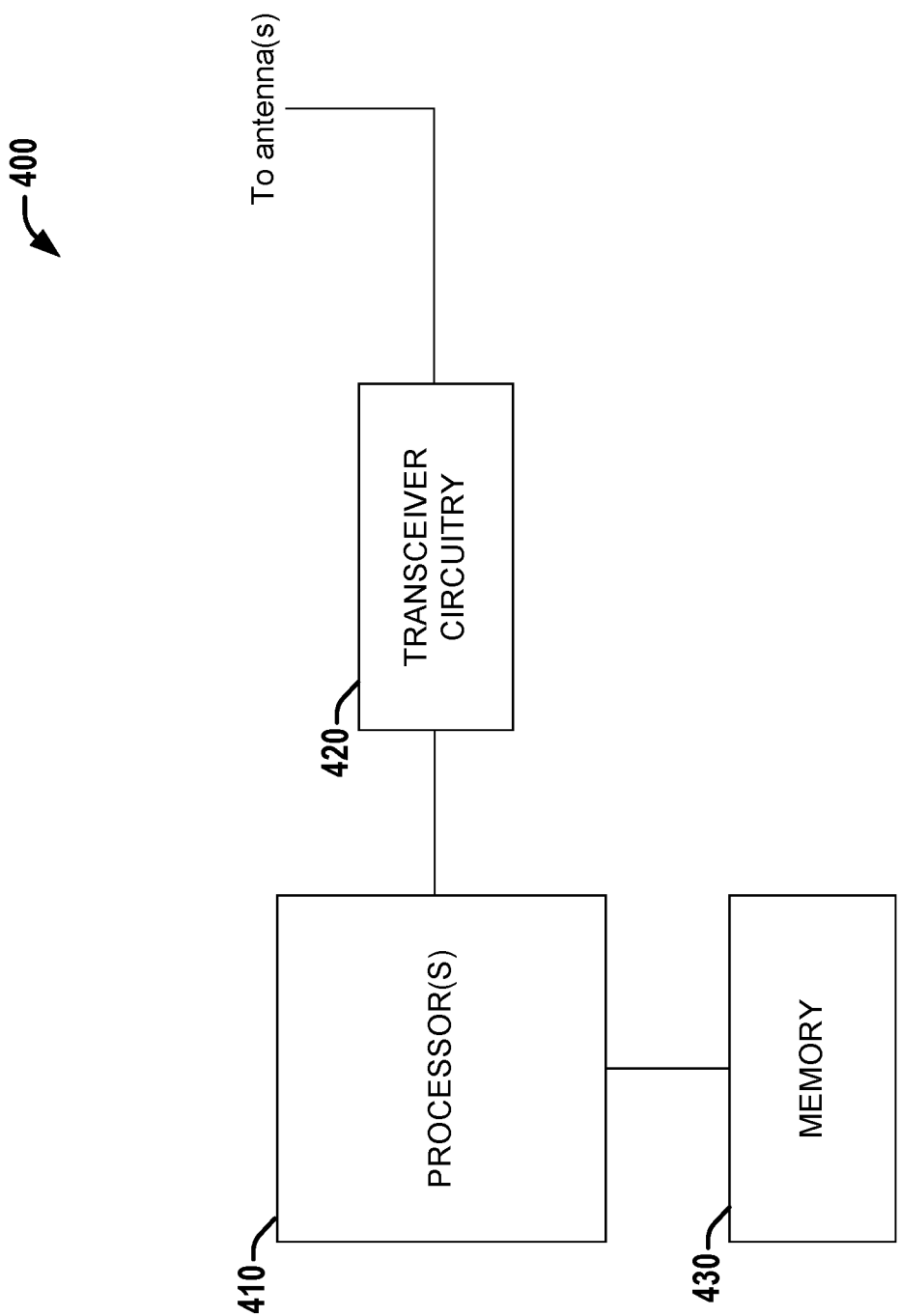
FIG. 4 is a block diagram illustrating a system employable at a UE (User Equipment) that facilitates UE-assisted assignment of measurement gap(s), according to various aspects described herein.

Referring to FIG. 4, illustrated is a block diagram of a system 400 employable at a UE (User Equipment) that facilitates UE-assisted assignment of measurement gap(s), according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate determination and configuration of which, if any, measurement gaps are appropriate for the UE, based on UE assistance.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
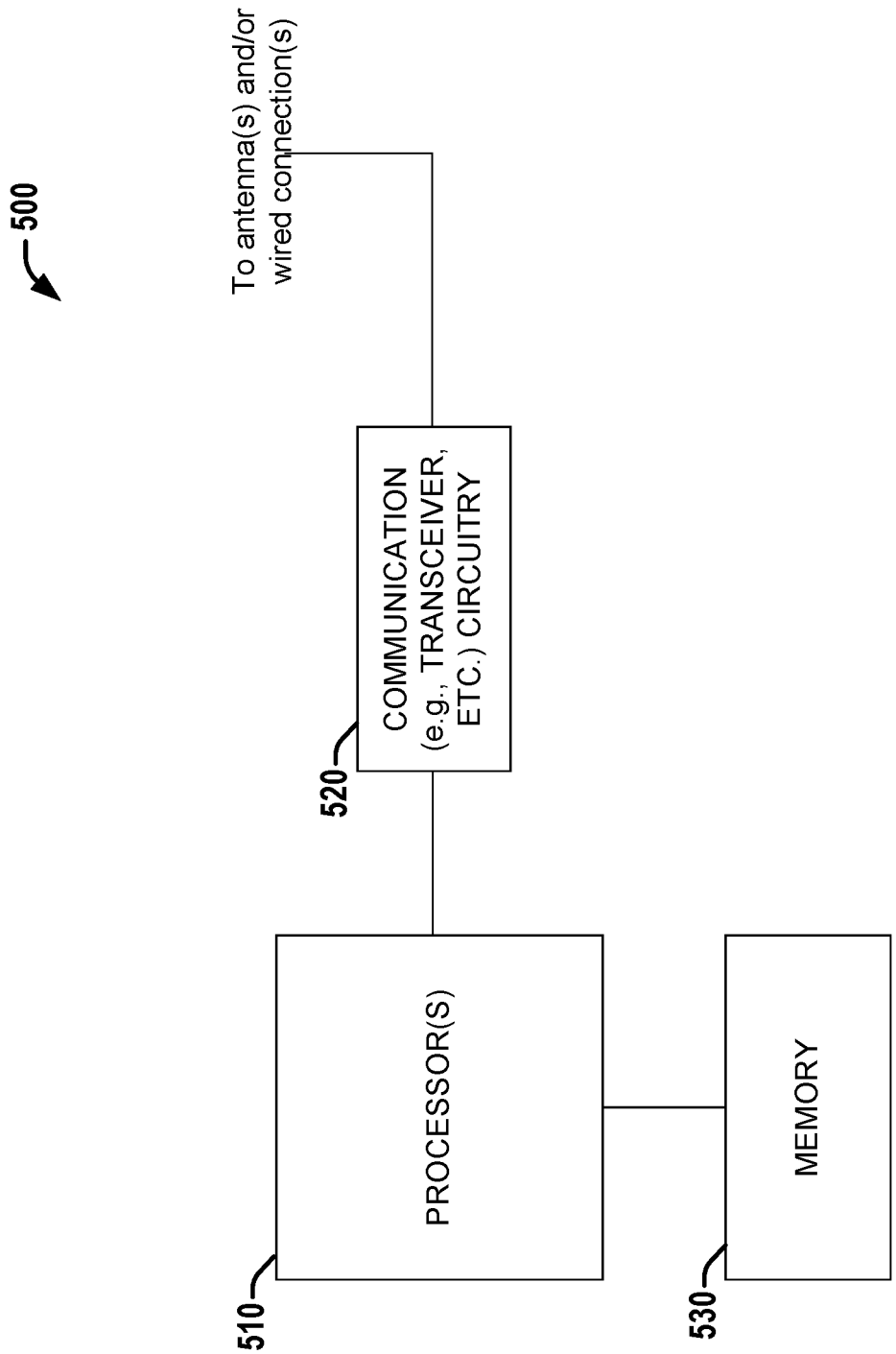
FIG. 5 is a block diagram illustrating a system employable at a BS (Base Station) that facilitates UE-assisted assignment of measurement gap(s), according to various aspects described herein.

Referring to FIG. 5, illustrated is a block diagram of a system 500 employable at a BS (Base Station) that facilitates UE-assisted assignment of measurement gap(s), according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate determination and configuration of which, if any, measurement gaps are appropriate for the UE.

The 3GPP (Third Generation Partnership Project) RAN1 (RAN (Radio Access Network) WG1 (Working Group 1)) made the following agreement during meeting #89:
1) The transmission of SS (Synchronization Signal) blocks within SS burst set is configured to a 5 ms window regardless of SS burst set periodicity 2) Within this 5 ms window, number of possible candidate SS block locations is L
3) The maximum number of SS-blocks within SS burst set, L, for different frequency ranges are
   a) For frequency range up to 3 GHz, L is 4
   b) For frequency range from 3 GHz to 6 GHz, L is 8
   c) For frequency range from 3 GHz to 6 GHz, L is 64
4) Note that RAN1 assumes minimum number of SS blocks transmitted within each SS burst set is one to define performance requirements As indicated above, RAN1 has determined that the SS burst set duration will be within the 5 ms window.

In legacy LTE (Long Term Evolution) systems, one measurement gap per US is used for inter-frequency and inter-RAT (Radio Access Technology) measurement, and no gap is used for intra-frequency measurement. The reason for this is that a LTE UE can perform intra-frequency measurement for multiple cells without the need to stop data transmission/reception or perform re-tuning. In NR (New Radio), however, the UE Rx (Receive) beamforming switching can be a factor. Because of this, the UE may not be able to transmit or receive data on the serving cell(s) while performing intra-frequency measurement. Another relevant scenario is when the SS blocks are distributed within the system BW (Bandwidth) of a NR system, and the RBs (Resource Blocks) wherein the UE is conducting data reception can be different from the SS block RBs, thus a gap can facilitate intra-frequency cell identification and measurement by the UE. Both of these scenarios can be facilitated via an intra-frequency measurement gap.

Additionally, a NR UE often will perform measurements not just in NR frequencies (e.g., 6 GHz and higher frequency bands, etc.), but also will perform measurements on LTE carriers. It can be difficult for the NW (Network) to know whether the UE can perform intra-frequency measurements without a measurement gap, or only with a measurement gap. Various embodiments discussed herein provide different solutions to facilitate network assignment of measurement gap based on UE assistance.

Although various embodiments discussed herein avoid or minimize standardization of Rx (Receive) beamforming implementation details, the implementation margin caused by Rx beamforming switching (e.g., via processor(s) 410 and transceiver circuitry 420) is still a consideration in embodiments discussed herein. For example, if the UE employs one or more specific Rx beams (e.g., generated by processor(s) 410 and transceiver circuitry 420) for a serving cell and employs different Rx beam(s) (e.g., generated by processor(s) 410 and transceiver circuitry 420) for measurement of a target cell, a measurement gap can be employed to facilitate Rx beam switching (e.g., via processor(s) 410 and transceiver circuitry 420). Such a scenario can be referred to as an inter-beam measurement. However, since the exact Rx beam(s) employed by the UE will not be known, in some embodiments, a measurement gap can be employed (e.g., the BS (e.g., employing system 500) configures a measurement gap via configuration signaling generated by processor(s) 510, transmitted via communication circuitry 520, received via transceiver circuitry 420, and processed by processor(s) 410) for all beamforming-based measurements (e.g., measurements above 6 GHz).

In the above scenarios, if the UE is capable of measurement without a measurement gap (referred to herein as non-gap measurement), in some embodiments, no measurement gap is employed (e.g., the BS (e.g., employing system 500) does not configure a measurement gap). However, in various embodiments, a baseline or default can be employing a measurement gap for gap based measurement (e.g., for UEs that perform gap-based measurement, UEs for which it is unknown if they are capable of non-gap measurement, etc.). A measurement scenario, as discussed herein, refers to measurement of measurement object(s) (e.g., non-serving frequency/ies) based on a serving frequency, given characteristics of the serving frequency and/or measurement object(s) (e.g., which may broadly or narrowly define the serving frequency and/or measurement object(s)). The following are examples of measurement scenarios: (a) intra-frequency measurement, (b) inter-frequency measurement, (c) inter-RAT measurement, (d) the serving frequency is in a first category of NR or LTE frequencies and the measurement object(s) are in a second category of NR or LTE frequencies, (f) the serving frequency is one of a first group of specific carrier(s) and the measurement object is one of a second group of specific carrier(s); or (f) the serving frequency and measurement object(s) are both high frequency in NR. Additional measurement scenarios exist, as discussed below.

Accordingly, in a first set of embodiments, a NR UE (e.g., employing system 400) can support a measurement gap as an optional feature for intra-frequency measurement, inter-frequency measurement, and/or inter-RAT measurement. In various embodiments, this can be configured by the NW (e.g., via configuration signaling generated by processor(s) 510, transmitted via communication circuitry 520, received via transceiver circuitry 420, and processed by processor(s) 410) in response to UE capability information (e.g., generated by processor(s) 410, transmitted via transceiver circuitry 420, received via communication circuitry 520, and processed by processor(s) 510). In various embodiments, the UE capability information can indicate capability for non-gap measurement (or whether to employ a measurement gap) for intra-frequency measurement (e.g., in general, or in various measurement scenarios, such as those indicated herein), inter-frequency measurement (e.g., in general, or in various measurement scenarios, such as those indicated herein), and/or inter-RAT measurement (e.g., in general, or in various measurement scenarios, such as those indicated herein).

In LTE, PSS (Primary SS) and SSS (Secondary SS) are sent on subframe 0 and subframe 5, therefore there will always be one PSS/SSS within 5 ms. Because the RAN1 agreements indicated above also include that the SS burst set (e.g., generated by processor(s) 510, transmitted via communication circuitry 520, received via transceiver circuitry 420, and processed by processor(s) 410) will be sent within a 5 ms window, within each NR SS burst, there will be at least one LTE PSS/SSS. Thus, in various embodiments, LTE and NR can employ the same measurement gap.

Accordingly, in a second set of embodiments, the same measurement gap can be employed (e.g., by system 400 and system 500) for both LTE and NR.

Additionally, in various embodiments, a UE can provide information (e.g., as part of UE capability information, etc.) to the network (e.g., generated by processor(s) 410, transmitted via transceiver circuitry 420, received via communication circuitry 520, and processed by processor(s) 510) that can assist in determining whether to employ a measurement gap for that UE in one or more measurement scenarios.

In a third set of embodiments, UE capability information (e.g., generated by processor(s) 410, transmitted via transceiver circuitry 420, received via communication circuitry 520, and processed by processor(s) 510) can indicate whether to employ a measurement gap for the UE for one or more categories of measurements. As an illustrative example, whether or not to employ a measurement gap (e.g., which can be configured by the NW via signaling generated by processor(s) 510, transmitted via communication circuitry 520, received via transceiver circuitry 420, and processed by processor(s) 410) can be indicated for each of the following categories: (1) serving frequency is LTE and measurement is sub 6 GHz in NR; (2) serving frequency is LTE and measurement is above 6 GHz in NR; (3) serving frequency is sub 6 GHz in NR and measurement is LTE; (4) serving frequency is sub 6 GHz in NR and measurement is above 6 GHz in NR; (5) serving frequency is above 6 GHz in NR and measurement is LTE; and (6) serving frequency is above 6 GHz in NR and measurement is sub 6 GHz in NR. In various embodiments, other categories can be employed.

In a fourth set of embodiments, UE capability information (e.g., generated by processor(s) 410, transmitted via transceiver circuitry 420, received via communication circuitry 520, and processed by processor(s) 510) can indicate whether to employ a measurement gap for the UE for one or more groups of carriers. The fourth set of embodiments is similar to the third set of embodiments, but can cover scenarios involving individual frequency carrier. In various such embodiments, the group(s) of frequency carrier can be fixed in the specification, or can be signaled by the network (e.g., via signaling generated by processor(s) 510, transmitted via communication circuitry 520, received via transceiver circuitry 420, and processed by processor(s) 410). In such embodiments, the UE can indicate (e.g., generated by processor(s) 410, transmitted via transceiver circuitry 420, received via communication circuitry 520, and processed by processor(s) 510) all combinations of a given serving frequency for which a measurement gap should be employed for measuring a given frequency carrier.

In a fifth set of embodiments, the UE can indicate whether a measurement gap should be employed given the configured serving frequency (e.g., configured via signaling generated processor(s) 510, transmitted via communication circuitry 520, received via transceiver circuitry 420, and processed by processor(s) 410). Various embodiments of the fifth set of embodiments can employ one of the following options for signaling generated by the UE. In a first option, after the network has configured the serving frequency (e.g., via signaling generated by processor(s) 510, transmitted via communication circuitry 520, received via transceiver circuitry 420, and processed by processor(s) 410), the UE can indicate to the network whether or not to employ a measurement gap (e.g., via signaling generated by processor(s) 410, transmitted via transceiver circuitry 420, received via communication circuitry 520, and processed by processor(s) 510). In a second option, after the network has configured both the serving frequency and the measurement objects (e.g., via signaling generated by processor(s) 510, transmitted via communication circuitry 520, received via transceiver circuitry 420, and processed by processor(s) 410), the UE can indicate to the network whether or not to employ a measurement gap (e.g., via signaling generated by processor(s) 410, transmitted via transceiver circuitry 420, received via communication circuitry 520, and processed by processor(s) 510) for each of the measurement objects.

In the fifth set of embodiments, for the time between configuration of the serving cell and indication by the UE of whether or not to employ a measurement gap, one of the following options can be employed in connection with the measurement gap: (1) a measurement gap can always be employed; or (2) a measurement gap can be employed or not based on a most recent configuration.

In a sixth set of embodiments, measurement gap configuration techniques discussed herein can be employed in connection with Rx beamforming at a UE. If the UE is using Rx beamforming (e.g., via processor(s) 410 and transceiver circuitry 420), it is possible the UE is not be capable of non-gap measurement for higher frequency bands in NR, regardless of the serving frequency. Thus, in the sixth set of embodiments, the UE can indicate (e.g., as part of UE capability information generated by processor(s) 410, transmitted via transceiver circuitry 420, received via communication circuitry 520, and processed by processor(s) 510) for which portions of high frequencies in NR (e.g., all, part, etc.) to configure a measurement gap. In various embodiments, the definition or identification of which portions of the NR can be indicated for configuration can be fixed in the specification or can be signaled by the network (e.g., generated by processor(s) 510, transmitted via communication circuitry 520, received via transceiver circuitry 420, and processed by processor(s) 410).

In a seventh set of embodiments, data transmission can be implemented in connection with one or more configured measurement gaps. In such embodiments, without requiring the network to perform RRC (Radio Resource Control) reconfiguration after the indication of measurement gap(s) is to allow for the possibility of the gap(s) to have data. In such embodiments, the UE can send an indication (e.g., generated by processor(s) 410, transmitted via transceiver circuitry 420, received via communication circuitry 520, and processed by processor(s) 510) to the network indicating that one or more gap(s) are not being used by the UE (e.g., because the UE is capable of non-gap measurement in the measurement scenario(s) associated with the gap(s)). In response to such indication(s) from the UE, the gNB can one or more of schedule data on those subframe(s) (e.g., for one or more of the unused gap(s)) and/or perform reconfiguration (e.g., such that the unused gap(s) are no longer configured).

Various sets of embodiments are discussed herein, each of which is associated with one or more features. However, individual embodiments can employ one or more of these specific features, and as such can belong to one or more of these sets of embodiments.

Figure 6:
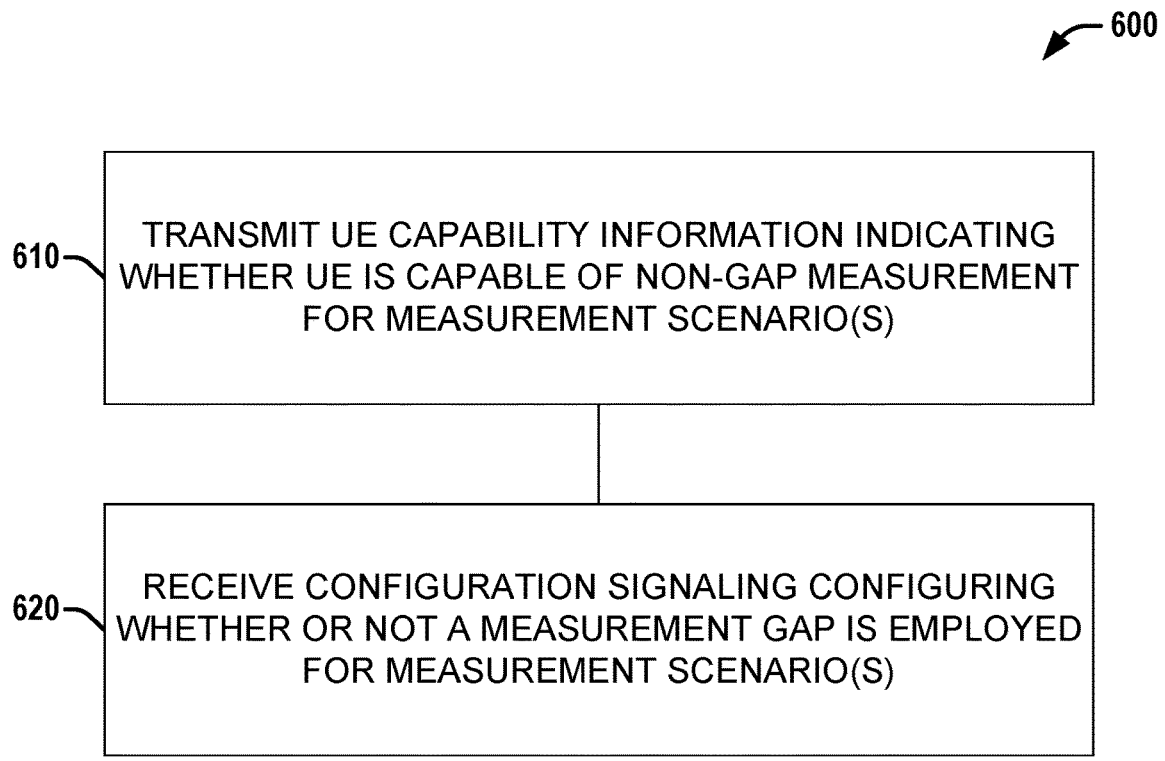
FIG. 6 is a flow diagram illustrating a first example method employable at a UE that facilitates UE-assisted assignment of measurement gap(s), according to various aspects discussed herein.

Referring to FIG. 6, illustrated is a flow diagram of a first example method 600 employable at a UE that facilitates UE-assisted assignment of measurement gap(s), according to various aspects discussed herein. In other aspects, a machine readable medium can store instructions associated with method 600 that, when executed, can cause a UE to perform the acts of method 600.

At 610, UE capability information can be transmitted that indicates whether the UE is capable of non-gap measurement for one or more measurement scenarios, such as example scenarios in embodiments discussed herein.

At 620, configuration signaling can be received that configures whether or not a measurement gap will be employed for each of the one or more measurement scenarios.

Additionally or alternatively, method 600 can include one or more other acts described herein in connection with various embodiments of system 400 discussed herein.

Figure 7:
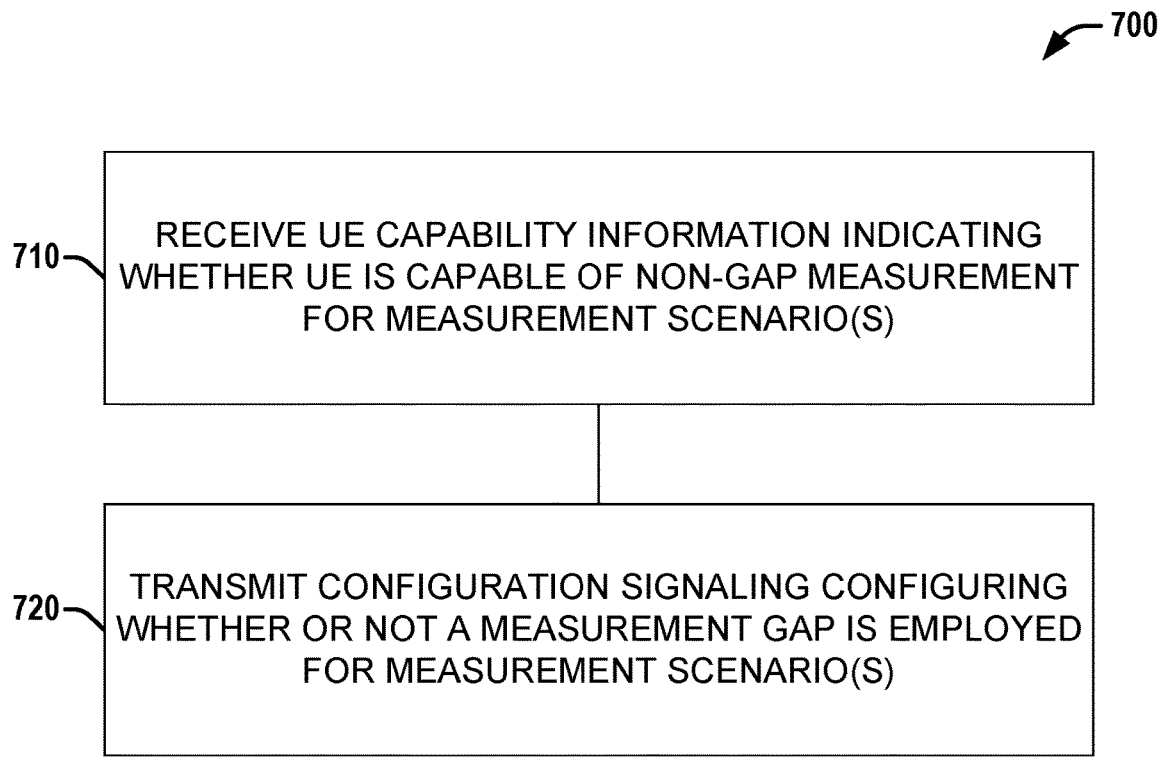
FIG. 7 is a flow diagram illustrating a first example method employable at a BS that facilitates UE-assisted assignment of measurement gap(s), according to various aspects discussed herein.

Referring to FIG. 7, illustrated is a flow diagram of a first example method 700 employable at a BS (e.g., gNB, etc.) that facilitates UE-assisted assignment of measurement gap(s), according to various aspects discussed herein. In other aspects, a machine readable medium can store instructions associated with method 700 that, when executed, can cause a BS to perform the acts of method 700.

At 710, UE capability information can be received that indicates whether the UE is capable of non-gap measurement for one or more measurement scenarios, such as example scenarios in embodiments discussed herein.

At 720, configuration signaling can be transmitted that configures whether or not a measurement gap will be employed for each of the one or more measurement scenarios.

Additionally or alternatively, method 700 can include one or more other acts described herein in connection with various embodiments of system 500 discussed herein.

Figure 8:
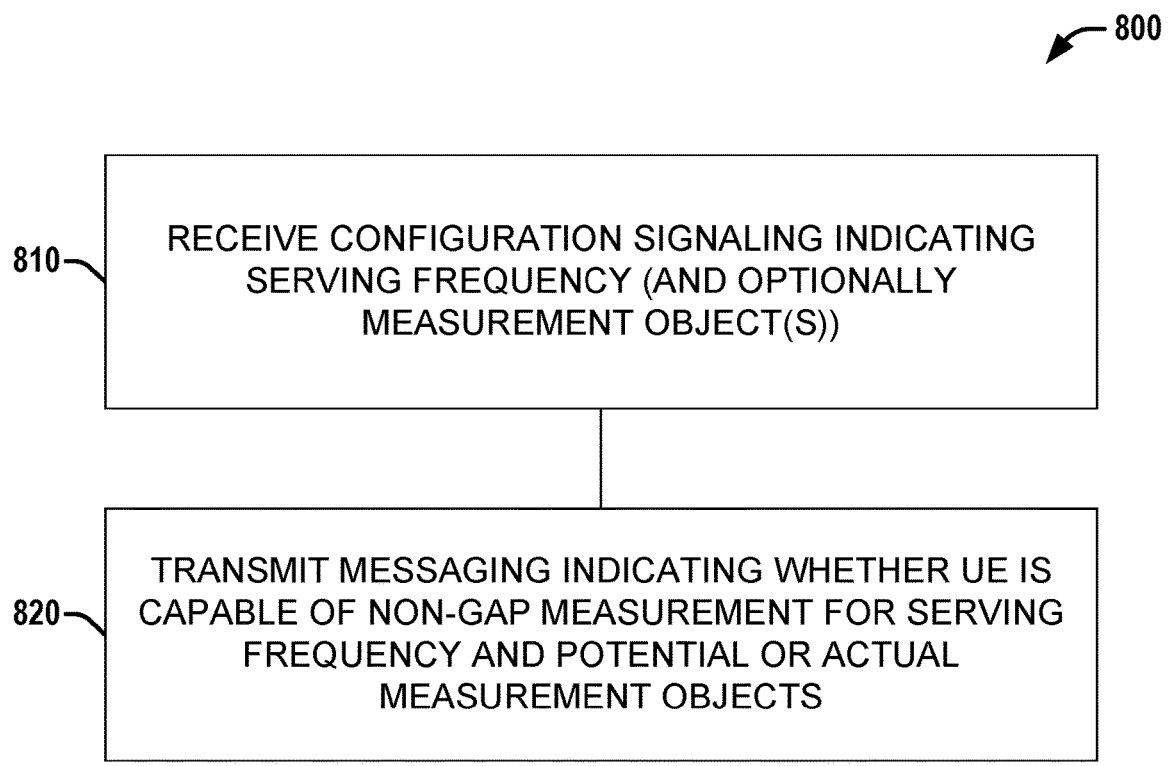
FIG. 8 is a flow diagram illustrating a second example method employable at a UE that facilitates UE-assisted assignment of measurement gap(s), according to various aspects discussed herein.

Referring to FIG. 8, illustrated is a flow diagram of a second example method 800 employable at a UE that facilitates UE-assisted assignment of measurement gap(s), according to various aspects discussed herein. In other aspects, a machine readable medium can store instructions associated with method 800 that, when executed, can cause a UE to perform the acts of method 800.

At 810, configuration signaling can be received that indicates a serving frequency for the UE, alone or with one or more configured measurement objects for the UE.

At 820, messaging can be transmitted indicating whether the UE is capable of non-gap measurement for the serving frequency and either one or more potential measurement objects or the one or more configured measurement objects.

Additionally or alternatively, method 800 can include one or more other acts described herein in connection with various embodiments of system 400 discussed herein.

Figure 9:
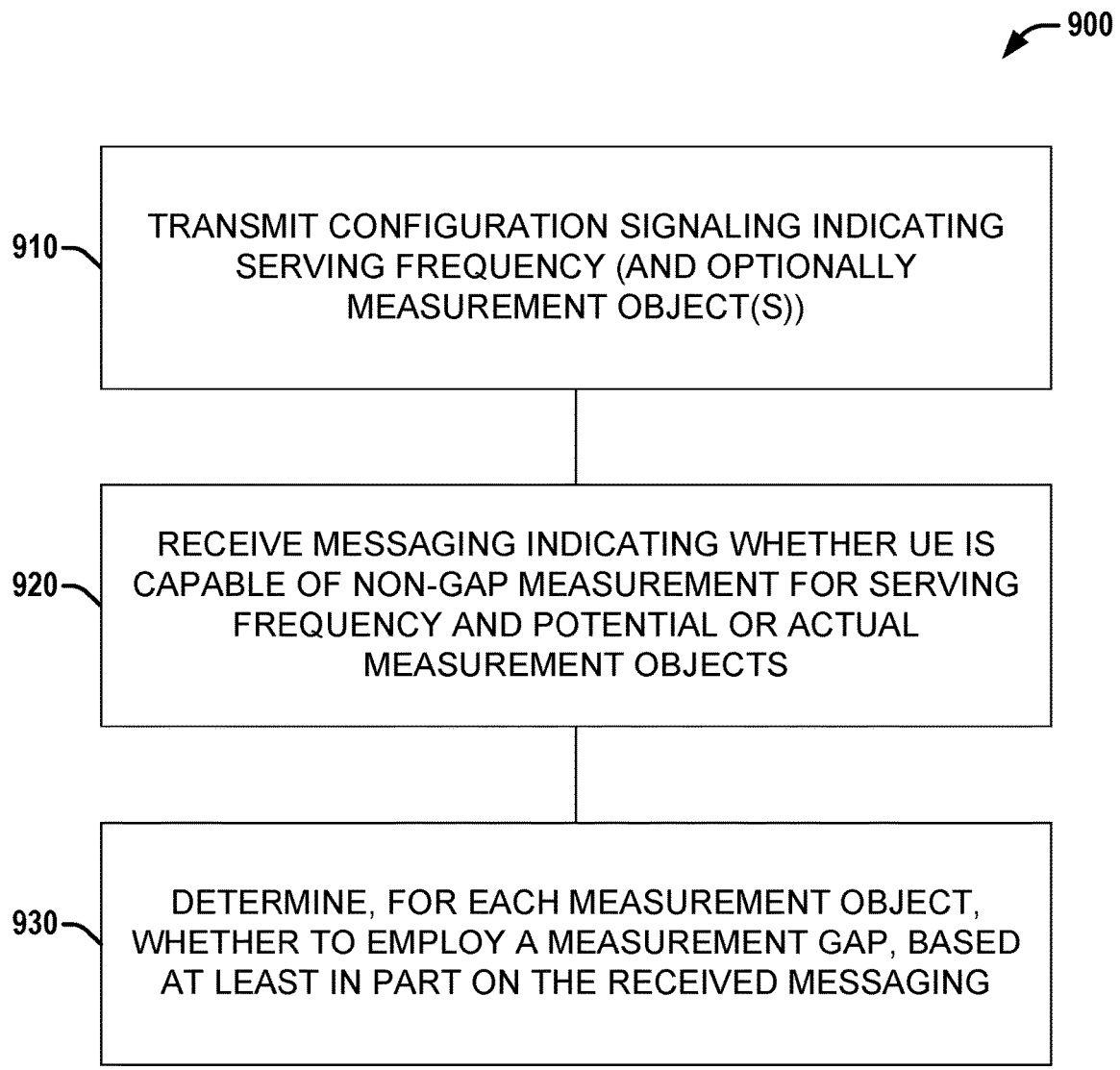
FIG. 9 is a flow diagram illustrating a second example method employable at a BS that facilitates UE-assisted assignment of measurement gap(s), according to various aspects discussed herein.

Referring to FIG. 9, illustrated is a flow diagram of a second example method 900 employable at a BS (e.g., gNB) that facilitates UE-assisted assignment of measurement gap(s), according to various aspects discussed herein. In other aspects, a machine readable medium can store instructions associated with method 900 that, when executed, can cause a UE to perform the acts of method 900.

At 910, configuration signaling can be transmitted that indicates a serving frequency for the UE, alone or with one or more configured measurement objects for the UE.

At 920, messaging can be received indicating whether the UE is capable of non-gap measurement for the serving frequency and either one or more potential measurement objects or the one or more configured measurement objects.

At 930, a determination can be made, for each actual measurement object for the UE, whether to employ a measurement gap, based at least in part on the received messaging.

Additionally or alternatively, method 900 can include one or more other acts described herein in connection with various embodiments of system 500 discussed herein.

Additional Embodiments

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

A first example embodiment comprises a system or method (e.g., employable by one or more of system 400 or system 500) that can facilitate support of a NR UE (e.g., employing system 400) for a measurement gap as an optional feature for one or more of intra-frequency, inter-frequency, and/or inter-RAT measurement. The UE can indicate (e.g., via UE capability information generated by processor(s) 410, transmitted via transceiver circuitry 420, received via communication circuitry 520, and processed by processor(s) 510) whether the UE supports non-gap measurement (or alternatively, whether to configure a measurement gap) for one or more of intra-frequency measurement, inter-frequency measurement, and/or inter-RAT measurement.

A second example embodiment comprises a system or method (e.g., employable by one or more of system 400 or system 500) that can facilitate support of a NR UE (e.g., employing system 400) employing and/or configuring (e.g., via configuration signaling (e.g., higher layer signaling (RRC (Radio Resource Control), MAC (Media Access Control), system information, etc.) or DCI (Downlink Control Information) generated by processor(s) 510, transmitted via communication circuitry 520, received via transceiver circuitry 420, and processed by processor(s) 410) the same measurement gap for LTE and NR (e.g., as opposed to a measurement gap that is RAT-specific or frequency-specific, etc.).

A third example embodiment comprises a system or method (e.g., employable by one or more of system 400 or system 500) that can facilitate support of a NR UE (e.g., employing system 400) employing and/or configuring (e.g., via configuration signaling generated by processor(s) 510, transmitted via communication circuitry 520, received via transceiver circuitry 420, and processed by processor(s) 410) the different measurement gaps for LTE and NR (e.g., measurement gap(s) that are RAT-specific or frequency-specific, etc.).

A fourth example embodiment comprises a system or method (e.g., employable by one or more of system 400 or system 500) that can facilitate measurement gap configuration (e.g., via configuration generated by processor(s) 510, transmitted via communication circuitry 520, received via transceiver circuitry 420, and processed by processor(s) 410) in response to UE capability information (e.g., generated by processor(s) 410, transmitted via transceiver circuitry 420, received via communication circuitry 520, and processed by processor(s) 510) that indicates capability of the UE to perform non-gap measurement for one or more categories of measurements. In one embodiment, the categories can comprise: (1) serving frequency is LTE and measurement is sub 6 GHz in NR; (2) serving frequency is LTE and measurement is above 6 GHz in NR; (3) serving frequency is sub 6 GHz in NR and measurement is LTE; (4) serving frequency is sub 6 GHz in NR and measurement is above 6 GHz in NR; (5) serving frequency is above 6 GHz in NR and measurement is LTE; and (6) serving frequency is above 6 GHz in NR and measurement is sub 6 GHz in NR. In various embodiments, other categories can be employed.

A fifth example embodiment comprises a system or method (e.g., employable by one or more of system 400 or system 500) that can facilitate measurement gap configuration (e.g., via configuration generated by processor(s) 510, transmitted via communication circuitry 520, received via transceiver circuitry 420, and processed by processor(s) 410) in response to UE capability information (e.g., generated by processor(s) 410, transmitted via transceiver circuitry 420, received via communication circuitry 520, and processed by processor(s) 510) that indicates capability of the UE to perform non-gap measurement for one or more groups of NR carriers.

A sixth example embodiment comprises a system or method (e.g., employable by one or more of system 400 or system 500) that can facilitate measurement gap configuration (e.g., via configuration generated by processor(s) 510, transmitted via communication circuitry 520, received via transceiver circuitry 420, and processed by processor(s) 410) in response to a UE request (e.g., generated by processor(s) 410, transmitted via transceiver circuitry 420, received via communication circuitry 520, and processed by processor(s) 510). Optionally, after the network has configured (e.g., generated by processor(s) 510, transmitted via communication circuitry 520, received via transceiver circuitry 420, and processed by processor(s) 410) the serving frequency, the UE can indicate (e.g., via a request generated by processor(s) 410) to the network whether or not to employ one or more measurement gaps. Alternatively, after the network has configured (e.g., generated by processor(s) 510, transmitted via communication circuitry 520, received via transceiver circuitry 420, and processed by processor(s) 410) the serving frequency and measurement object(s), the UE can indicate (e.g., via a request generated by processor(s) 410) to the network whether or not to employ one or more measurement gaps for the measurement object(s). For the time between configuration and UE indication, the network can one of (a) always employ a measurement gap (e.g., via processor(s) 510 and communication circuitry 520) or (b) employ a measurement gap (e.g., via processor(s) 510 and communication circuitry 520) based on a previous configuration (e.g., employ a measurement gap in the context(s) a measurement gap was employed in the previous configuration).

A seventh example embodiment comprises a system or method (e.g., employable by one or more of system 400 or system 500) that can facilitate measurement gap configuration (e.g., via configuration generated by processor(s) 510, transmitted via communication circuitry 520, received via transceiver circuitry 420, and processed by processor(s) 410) in connection with Rx beamforming, wherein the UE can indicate (e.g., as part of UE capability information generated by processor(s) 410, transmitted via transceiver circuitry 420, received via communication circuitry 520, and processed by processor(s) 510) for which portions of high frequencies in NR (e.g., all, part, etc.) to configure a measurement gap.

An eighth example embodiment comprises a system or method (e.g., employable by one or more of system 400 or system 500) that can facilitate data transmission (e.g., via configuration generated by processor(s) 510, transmitted via communication circuitry 520, received via transceiver circuitry 420, and processed by processor(s) 410) in configured measurement gap(s) in response to UE signaling (e.g., generated by processor(s) 410, transmitted via transceiver circuitry 420, received via communication circuitry 520, and processed by processor(s) 510) that indicates that the measurement gap(s) will be unused and one of can be reconfigured or data can be transmitted on the measurement gap(s).

Example 1 is an apparatus configured to be employed in a UE (User Equipment), comprising: a memory interface; and processing circuitry configured to: generate UE capability information that comprises, for each measurement scenario of one or more measurement scenarios, an indication of whether the UE is capable of non-gap measurement in connection with that measurement scenario, wherein each measurement scenario applies to one or more associated serving frequencies and one or more associated measurement objects; process configuration signaling that comprises, for each measurement scenario of the one or more measurement scenarios, an associated indication of whether an associated measurement gap is configured for that measurement scenario; and send the associated indication for each measurement scenario of the one or more measurement scenarios to a memory via the memory interface.

Example 2 comprises the subject matter of any variation of any of example(s) 1, wherein the one or more measurement scenarios comprise at least one of an intra-frequency measurement scenario, an inter-frequency measurement scenario, or an inter-RAT (Radio Access Technology) measurement scenario.

Example 3 comprises the subject matter of any variation of any of example(s) 1, wherein a first measurement scenario of the one or more measurement scenarios has a NR (New Radio) serving frequency, and wherein the associated measurement gap for the first measurement scenario is the same as a LTE (Long Term Evolution) measurement gap.

Example 4 comprises the subject matter of any variation of any of example(s) 1, wherein a second measurement scenario of the one or more measurement scenarios has a NR (New Radio) serving frequency, and wherein the associated measurement gap for the second measurement scenario is different than a LTE (Long Term Evolution) measurement gap.

Example 5 comprises the subject matter of any variation of any of example(s) 1-4, wherein, for each measurement scenario of the one or more measurement scenarios, each of the one or more associated serving frequencies belongs to a first category of frequencies and each of the one or more associated measurement objects belongs to a second category of frequencies.

Example 6 comprises the subject matter of any variation of any of example(s) 5, wherein, for each measurement scenario of the one or more measurement scenarios, each of the first category of frequencies and the second category of frequencies is one of LTE (Long Term Evolution) frequencies, NR (New Radio) frequencies below 6 GHz, or NR frequencies above 6 GHz.

Example 7 comprises the subject matter of any variation of any of example(s) 1-4, wherein, for each measurement scenario of the one or more measurement scenarios, each of the one or more associated serving frequencies belongs to an associated group of serving frequencies and each of the one or more associated measurement objects belongs to an associated group of measurement objects.

Example 8 comprises the subject matter of any variation of any of example(s) 1-4, wherein, for a third measurement scenario of the one or more measurement scenarios, the one or more associated serving frequencies and the one or more associated measurement objects both comprise one of a high frequency NR (New Radio) bandwidth or a portion of the high frequency NR bandwidth.

Example 9 comprises the subject matter of any variation of any of example(s) 1-4, wherein the configuration signaling comprises, for a fourth measurement scenario of the one or more measurement scenarios, an associated indication that an associated measurement gap is configured for the fourth measurement scenario, and wherein the processing circuitry is further configured to: generate an indication that the associated measurement gap of the fourth scenario is unused; and one of: receive additional configuration signaling that indicates that the associated measurement gap is not configured for the fourth measurement scenario or process data mapped to the associated measurement gap configured for the fourth measurement scenario.

Example 10 is an apparatus configured to be employed in a gNB (next generation NodeB), comprising: a memory interface; and processing circuitry configured to: process UE (User Equipment) capability information that comprises, for each measurement scenario of one or more measurement scenarios, an indication of whether a UE is capable of non-gap measurement in connection with that measurement scenario, wherein each measurement scenario applies to one or more associated serving frequencies and one or more associated measurement objects; generate configuration signaling that comprises, for each measurement scenario of the one or more measurement scenarios, an associated indication of whether an associated measurement gap is configured for that measurement scenario; and send the associated indication for each measurement scenario of the one or more measurement scenarios to a memory via the memory interface.

Example 11 comprises the subject matter of any variation of any of example(s) 10, wherein the one or more measurement scenarios comprise at least one of an intra-frequency measurement scenario, an inter-frequency measurement scenario, or an inter-RAT (Radio Access Technology) measurement scenario.

Example 12 comprises the subject matter of any variation of any of example(s) 10, wherein a first measurement scenario of the one or more measurement scenarios has a NR (New Radio) serving frequency, and wherein the associated measurement gap for the first measurement scenario is the same as a LTE (Long Term Evolution) measurement gap.

Example 13 comprises the subject matter of any variation of any of example(s) 10, wherein a second measurement scenario of the one or more measurement scenarios has a NR (New Radio) serving frequency, and wherein the associated measurement gap for the second measurement scenario is different than a LTE (Long Term Evolution) measurement gap.

Example 14 comprises the subject matter of any variation of any of example(s) 10-13, wherein, for each measurement scenario of the one or more measurement scenarios, each of the one or more associated serving frequencies belongs to a first category of frequencies and each of the one or more associated measurement objects belongs to a second category of frequencies.

Example 15 comprises the subject matter of any variation of any of example(s) 14, wherein, for each measurement scenario of the one or more measurement scenarios, each of the first category of frequencies and the second category of frequencies is one of LTE (Long Term Evolution) frequencies, NR (New Radio) frequencies below 6 GHz, or NR frequencies above 6 GHz.

Example 16 comprises the subject matter of any variation of any of example(s) 10-13, wherein, for each measurement scenario of the one or more measurement scenarios, each of the one or more associated serving frequencies belongs to an associated group of serving frequencies and each of the one or more associated measurement objects belongs to an associated group of measurement objects.

Example 17 comprises the subject matter of any variation of any of example(s) 10-13, wherein, for a third measurement scenario of the one or more measurement scenarios, the one or more associated serving frequencies and the one or more associated measurement objects both comprise one of a high frequency NR (New Radio) bandwidth or a portion of the high frequency NR bandwidth.

Example 18 comprises the subject matter of any variation of any of example(s) 10-13, wherein the configuration signaling comprises, for a fourth measurement scenario of the one or more measurement scenarios, an associated indication that an associated measurement gap is configured for the fourth measurement scenario, and wherein the processing circuitry is further configured to: process an indication that the associated measurement gap of the fourth scenario is unused; and one of: generate additional configuration signaling that indicates that the associated measurement gap is not configured for the fourth measurement scenario or map data to the associated measurement gap configured for the fourth measurement scenario.

Example 19 is an apparatus configured to be employed in a UE (User Equipment), comprising: a memory interface; and processing circuitry configured to: process configuration signaling comprising an indication of a serving frequency; generate messaging that comprises, for that serving frequency, an indication of whether the UE is capable of non-gap measurement in connection with one or more measurement objects; and send the indication of the serving frequency to a memory via the memory interface.

Example 20 comprises the subject matter of any variation of any of example(s) 19, wherein the configuration signaling indicates one or more configured measurement objects for the UE, and wherein the one or more measurement objects are the one or more configured measurement objects.

Example 21 is an apparatus configured to be employed in a gNB (next generation NodeB), comprising: a memory interface; and processing circuitry configured to: generate configuration signaling comprising an indication of a serving frequency; process messaging that comprises, for that serving frequency, an indication of whether a UE (User Equipment) is capable of non-gap measurement in connection with one or more measurement objects; make a determination, for each measurement gap of the one or more measurement objects, whether to employ a measurement gap in connection with that measurement object; and send the indication of the serving frequency to a memory via the memory interface.

Example 22 comprises the subject matter of any variation of any of example(s) 21, wherein the configuration signaling indicates one or more configured measurement objects, and wherein the one or more measurement objects are the one or more configured measurement objects.

Example 23 comprises the subject matter of any variation of any of example(s) 21-22, wherein, prior to processing the messaging, the processing circuitry is configured to employ a measurement gap in connection with each measurement object of the one or more measurement objects.

Example 24 comprises the subject matter of any variation of any of example(s) 21-22, wherein, prior to processing the messaging, the processing circuitry is configured to make an additional determination, for each measurement gap of the one or more measurement gaps, whether to employ a measurement gap based on a previous configuration.

Example 25 comprises an apparatus comprising means for executing any of the described operations of examples 1-24.

Example 26 comprises a machine readable medium that stores instructions for execution by a processor to perform any of the described operations of examples 1-24.

Example 27 comprises an apparatus comprising: a memory interface; and processing circuitry configured to: perform any of the described operations of examples 1-24.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A UE (User Equipment), comprising:
a memory interface; and
processing circuitry configured to:
    receive a configuration signaling from a base station that comprises, for each measurement scenario of one or more measurement scenarios, an associated indication of whether an associated measurement gap is configured for that measurement scenario;
    generate an indication that the associated measurement gap of a first measurement scenario of the one or more measurement scenarios is unused;
    send the associated indication for the first measurement scenario of the one or more measurement scenarios to the base station; and
    one of: receive additional configuration signaling that indicates that the associated measurement gap is not configured for the first measurement scenario or process data mapped to the associated measurement gap configured for the first measurement scenario.

2. The UE of claim 1, wherein the one or more measurement scenarios comprise at least one of an intra-frequency measurement scenario, an inter-frequency measurement scenario, or an inter-RAT (Radio Access Technology) measurement scenario.

3. The UE of claim 1, wherein a second measurement scenario of the one or more measurement scenarios has a NR (New Radio) serving frequency, and wherein the associated measurement gap for the second measurement scenario is the same as a LTE (Long Term Evolution) measurement gap.

4. The UE of claim 1, wherein a second measurement scenario of the one or more measurement scenarios has a NR (New Radio) serving frequency, and wherein the associated measurement gap for the second measurement scenario is different than a LTE (Long Term Evolution) measurement gap.

5. The UE of claim 1, wherein, for each measurement scenario of the one or more measurement scenarios, each of the one or more associated serving frequencies belongs to a first category of frequencies and each of the one or more associated measurement objects belongs to a second category of frequencies.

6. The UE of claim 5, wherein, for each measurement scenario of the one or more measurement scenarios, each of the first category of frequencies and the second category of frequencies is one of LTE (Long Term Evolution) frequencies, NR (New Radio) frequencies below 6 GHz, or NR frequencies above 6 GHz.

7. The UE of claim 1, wherein, for each measurement scenario of the one or more measurement scenarios, each of the one or more associated serving frequencies belongs to an associated group of serving frequencies and each of the one or more associated measurement objects belongs to an associated group of measurement objects.

8. The UE of claim 1, wherein, for a second measurement scenario of the one or more measurement scenarios, the one or more associated serving frequencies and the one or more associated measurement objects both comprise one of a high frequency NR (New Radio) bandwidth or a portion of the high frequency NR bandwidth.

9. A Base Station (BS), comprising:
a memory interface; and
processing circuitry configured to:
    generate configuration signaling for a User Equipment (UE) that comprises, for each measurement scenario of the one or more measurement scenarios, an associated indication of whether an associated measurement gap is configured for that measurement scenario, wherein the configuration signaling comprises, for a first measurement scenario of the one or more measurement scenarios, an associated indication that an associated measurement gap is configured for the first measurement scenario;
    receive an indication that the associated measurement gap of the first measurement scenario is unused; and
    one of: generate additional configuration signaling that indicates that the associated measurement gap is not configured for the first measurement scenario or map data to the associated measurement gap configured for the first measurement scenario.

10. The BS of claim 9, wherein the one or more measurement scenarios comprise at least one of an intra-frequency measurement scenario, an inter-frequency measurement scenario, or an inter-RAT (Radio Access Technology) measurement scenario.

11. The BS of claim 9, wherein a first measurement scenario of the one or more measurement scenarios has a NR (New Radio) serving frequency, and wherein the associated measurement gap for the first measurement scenario is the same as a LTE (Long Term Evolution) measurement gap.

12. The BS of claim 9, wherein a second measurement scenario of the one or more measurement scenarios has a NR (New Radio) serving frequency, and wherein the associated measurement gap for the second measurement scenario is different than a LTE (Long Term Evolution) measurement gap.

13. The BS of claim 9, wherein, for each measurement scenario of the one or more measurement scenarios, each of the one or more associated serving frequencies belongs to a first category of frequencies and each of the one or more associated measurement objects belongs to a second category of frequencies.

14. The BS of claim 13, wherein, for each measurement scenario of the one or more measurement scenarios, each of the first category of frequencies and the second category of frequencies is one of LTE (Long Term Evolution) frequencies, NR (New Radio) frequencies below 6 GHz, or NR frequencies above 6 GHz.

15. The BS of claim 9, wherein, for each measurement scenario of the one or more measurement scenarios, each of the one or more associated serving frequencies belongs to an associated group of serving frequencies and each of the one or more associated measurement objects belongs to an associated group of measurement objects.

16. The BS of claim 9, wherein, for a second measurement scenario of the one or more measurement scenarios, the one or more associated serving frequencies and the one or more associated measurement objects both comprise one of a high frequency NR (New Radio) bandwidth or a portion of the high frequency NR bandwidth.

* * * * *